(12) United States Patent
Liu et al.

(10) Patent No.: US 11,755,792 B2
(45) Date of Patent: Sep. 12, 2023

(54) STRESS ANALYSIS FOR PLASTIC MATERIAL LINED TUBULAR STRUCTURES FOR BOREHOLES

(71) Applicant: Landmark Graphics Corporation, Houston, TX (US)

(72) Inventors: Zhengchun Liu, Sugar Land, TX (US); Robello Samuel, Cypress, TX (US); Adolfo Gonzales, Houston, TX (US); Yongfeng Kang, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 307 days.

(21) Appl. No.: 17/152,335

(22) Filed: Jan. 19, 2021

(65) Prior Publication Data
US 2022/0229951 A1    Jul. 21, 2022

(51) Int. Cl.
*G06F 30/20*    (2020.01)
*E21B 17/00*    (2006.01)
(Continued)

(52) U.S. Cl.
CPC .............. *G06F 30/20* (2020.01); *E21B 17/00* (2013.01); *E21B 2200/20* (2020.05); *G06F 2119/08* (2020.01); *G06F 2119/14* (2020.01)

(58) Field of Classification Search
CPC .. G06F 30/20; G06F 2119/08; G06F 2119/14; E21B 17/00; E21B 2200/20
See application file for complete search history.

(56) References Cited

U.S. PATENT DOCUMENTS 9,752,420 B2    9/2017  Shaw et al.
11,416,650 B2 *  8/2022  Liu ..................... E21B 17/08
(Continued)

FOREIGN PATENT DOCUMENTS

CN    101265996 A    9/2008
CN    111425170 A    7/2020
WO    2018231256 A1    12/2018

OTHER PUBLICATIONS

Omar S. Al-Abri, Tasneem Pervez. "Structural behavior of solid expandable tubular undergoes radial expansion process—Analytical, numerical, and experimental approaches International Journal of Solids and Structures". vol. 50, Issue 19. 2013. pp. 2980-2994. ISSN 0020-7683. (Year: 2013).*

(Continued)

*Primary Examiner* — Eunhee Kim
(74) *Attorney, Agent, or Firm* — Michael Jenney; Parker Justiss, P.C.

(57) ABSTRACT

The disclosure presents processes for improving the design phase of plastic material lined tubular structures used downhole of a borehole. A plastic material lined tubular structure model is utilized for tubular structures that have a metal layer, a grout layer, and a plastic material layer. The model can use a modified wall thickness for the metal layer. A strength model can be applied to the modified critical dimensions, e.g., wall thickness parameters. A thermal model can be applied to the tubular structure to determine pressure and temperature parameters. The strength model and the thermal model outputs can be utilized by a stress analyzer to determine loads, safety factors, and design limit parameters. The plastic material lined tubular structure model can enable more efficient use of tubular structures, designing a longer operational lifetime, such as in acidic (Continued)

environments, or the use of thinner structures while maintaining a satisfactory operational lifetime.

21 Claims, 9 Drawing Sheets

(51) Int. Cl.
    *G06F 119/14*     (2020.01)
    *G06F 119/08*     (2020.01)

(56) References Cited

U.S. PATENT DOCUMENTS

| | | | |
|---|---|---|---|
| 2008/0196900 A1* | 8/2008 | Leibfried | B23P 6/00 |
| | | | 264/516 |
| 2015/0292323 A1 | 10/2015 | Shahri et al. | |
| 2018/0142536 A1* | 5/2018 | Liu | G06F 30/20 |

OTHER PUBLICATIONS

Li, et al.; "Experimental Study and Finite Element Analysis of Critical Stresses of Reinforced Thermoplastic Pipes Under Various Loads"; DOI 10.1007/s11223-016-9752-5; Strength of Materials, vol. 48, No. 1; Jan. 2016; 9 pgs.

Craster, et al.; "Exposure of Various Polymer-lined Carbon Steel Pipe Sections to a Sour Hydrocarbon Fluid at a Maximum Service Temperature: Methodology and Observations"; NACE International; Paper No. C2020-14821; 2020; 16 pgs.

Duthie, et al.; "Effective Corrosion Mitigation Exploiting Glass Reinforced Epoxy Lined Tubulars in Offshore Producing & Injection Wells"; OTC-29266-MS; Offshore Technology Conference; May 6-9, 2019; 11 pgs.

Sharif, et al.; "Experience with Fiberglass (GRE) Lined Carbon Steel Tubular for Corrosion Protection for Oil Production Applications"; SPE International; SPE 160236; SPE Annual Technical Conference and Exhibition; Oct. 8-10, 2012; 14 pgs.

* cited by examiner

STRESS ANALYSIS FOR PLASTIC MATERIAL LINED TUBULAR STRUCTURES FOR BOREHOLES

TECHNICAL FIELD

This application is directed, in general, to tubular structure design for boreholes and, more specifically, to using a plastic material lining for tubular structures.

BACKGROUND

When developing and drilling boreholes, it is important to be able to support the borehole against collapse, ensure borehole integrity, and protect equipment that is lowered into the borehole from fluid corrosion. In addition, the borehole may be exposed to varying temperatures, varying pressures, formation fluids, electromagnetic radiation, and varying types of mineralogy. These factors can adversely affect the equipment lowered into the borehole. Tubular structures, for example, casing, tubing, or drill string, can assist in protecting the equipment, as well as in some aspects of supporting the borehole against formation leakage and collapse. It would be beneficial to improve the efficiency of the borehole design, by more accurate stress analysis of the tubular structures used within the borehole when using plastic material lined tubular structures. The plastic material may cause a challenge for borehole tubular design since the thermal and mechanical properties of plastic material may be very different from those of carbon steels.

SUMMARY

In one aspect a method is disclosed. In one embodiment, the method includes (1) receiving input parameters for a tubular structure design of a plastic material lined tubular structure of a borehole, wherein the tubular structure design utilizes a thermal model and one or more strength models, (2) modifying one or more input parameters to generate modified input parameters, wherein an initial wall thickness of the tubular structure is modified to an adjusted wall thickness for each layer of the tubular structure using the input parameters, (3) applying the modified input parameters to the one or more strength models to generate a respective strength rating, (4) generating a pressure parameter and a temperature parameter using the input parameters and the thermal model, and (5) executing a stress analysis utilizing the modified input parameters, the respective strength rating, the pressure parameter, and the temperature parameter.

In a second aspect a tubular structure design system is disclosed. In one embodiment, the tubular structure design system includes (1) a parameter receiver, capable to receive input parameters, (2) a result transceiver, capable of communicating result parameters, and (3) a stress analyzer, capable of utilizing the input parameters to determine one or more load factors, one or more safety factors, or one or more design limit parameters to apply to a plastic material lined tubular structure for a tubular structure design for a borehole, and to generate the result parameters, wherein a thermal model and one or more strength models are utilized to generate the result parameters.

In a third aspect a computer program product having a series of operating instructions stored on a non-transitory computer-readable medium that directs a data processing apparatus when executed thereby to perform operations is disclosed. In one embodiment, the operations include (1) receiving input parameters for a tubular structure design of a plastic material lined tubular structure of a borehole, wherein the tubular structure design utilizes a thermal model and one or more strength models, (2) modifying one or more input parameters to generate modified input parameters, wherein an initial wall thickness of the tubular structure is modified to an adjusted wall thickness for each layer of the tubular structure using the input parameters, (3) applying the modified input parameters to the one or more strength models to generate a respective strength rating, (4) generating a pressure parameter and a temperature parameter using the input parameters and the thermal model, and (5) executing a stress analysis utilizing the modified input parameters, the respective strength rating, the pressure parameter, and the temperature parameter.

BRIEF DESCRIPTION

Reference is now made to the following descriptions taken in conjunction with the accompanying drawings, in which.

DETAILED DESCRIPTION

When designing borehole systems, one factor to be considered is the lifetime integrity of tubular structures to be used in the borehole. It is beneficial at the stage of tubular structure design to conduct detailed stress analyses, including the damage factors, such as corrosion and mechanical wear. First, tubular structures should be sufficiently strong to withstand the pressures and stresses associated with fluid flow between the formation and borehole surface during drilling, production, and stimulation operations. The safety factors, e.g., a ratio of resistance to load, of various load scenarios such as burst, collapse, tension, compression, and triaxial should be greater than the required design factor, e.g., a design factor of 1.0. To ensure the tubular structure meets the operational goal, such as satisfying the operational lifetime of the borehole or another specified time interval, the estimated total amount of material loss or corrosion, e.g., metal loss or other material loss, can be compared against the determined maximum allowable wear, or a maximum allowable material loss, as a safety check of the design.

Tubular structures can vary as to the material used and the thickness of the wall of the tubular structure. The type of tubular structure used at a particular depth can be different than the tubular structure used in another portion of the borehole. During the design phase, it is beneficial to select a tubular structure that can maximize the efficiency of the borehole operations at a particular location within the borehole.

Additional cost could be incurred in replacing a section of the tubular structure if that portion or section of the tubular structure wears out sooner than planned. Wear on the tubular structure can occur due to various factors, for example, physical or mechanical wearing due to trip in or trip out of tools such as a wireline tool or a drill string, physical or mechanical wearing due to rotation of a drill string, corrosion factors, pressure factors, temperature factors, mineralogy factors, and other factors.

Typically, users design the tubular structures against various load factors such as axial, triaxial, burst, compression, torsion, and collapse. Designing for the various load factors can involve modeling and simulating tubular structures under various conditions and factors. Conventionally, tubular structure loads, e.g., integrity or safety factors, can be calculated using industry accepted models. In some aspects, the conventional wear and strength models can miss estimate the load ratings of the tubular structure. As a result, the tubular structure could be over-designed in terms of the load factor, which is not cost effective for the borehole system. Tubular structures can be casing, pipes, drill strings, downhole tools, and other types of tubular structures. Tubular structures can be constructed of a metal layer of steel, carbon-steel, other metallic alloys, or other materials, as well as a plastic material layer attached to the metal layer.

Corrosion in borehole completions can lead to borehole integrity issues, leading to an increase in expense to repair or replace those sections of the tubular structure affected by the corrosion. Using corrosive resistant alloys for the tubular structures in boreholes subject to higher corrosive effects can increase the cost of the tubular structures. Using plastic material to line tubular structures can lower the cost for each section of the tubular structure while improving the corrosion resistance. For example, the plastic material can be a polymer, a glass fiber reinforced epoxy (GRE), or a carbon fiber plastic composite. The plastic material can exhibit thermal and mechanical characteristics that differ from the conventional tubular structure material. Conventional tubular structure design systems may not be able to utilize plastic material. Implementing a stress analysis for plastic material lined tubular structures can involve a time consuming three-dimensional finite element method.

This disclosure presents processes and methods to analyze a tubular structure design where the tubular structure incorporates a plastic material lined tubular structure, such as where the plastic material is attached to the internal diameter (ID) of the tubular structure using a grout, e.g., adhesive. The tubular structure design can utilize an approximate stress analysis of plastic material lined tubular structures. The equivalent density, the equivalent thermal conductivity, and the equivalent thermal capacity can be determined for the plastic material lined tubular structure and used in a simulation of the heat transfer.

These equivalent thermal conduction properties and heat transfer analysis can be utilized for a thermal flow analysis of various borehole operations, such as a production operation, an injection operation, a drilling operation, or other borehole operations. The thermal flow analysis can be used to generate pressure and temperature parameters, which can be used as inputs, along with tubular structure model data, to a stress analyzer. The stress analyzer can utilize the non-plastic material portion of the tubular structure for the tubular structure modeling, e.g., using the critical dimension, which can be a percentage of the initial wall thickness used in the calculations of the axial, triaxial, burst, collapse, torsion, and compression ratings. In some aspects, the stress analysis can utilize a strength factor contribution from the plastic material of zero, which can allow a more conservative strength calculation of the tubular structure design. In some aspects, the strength factor contribution from the plastic material can be specified.

Figure 1:
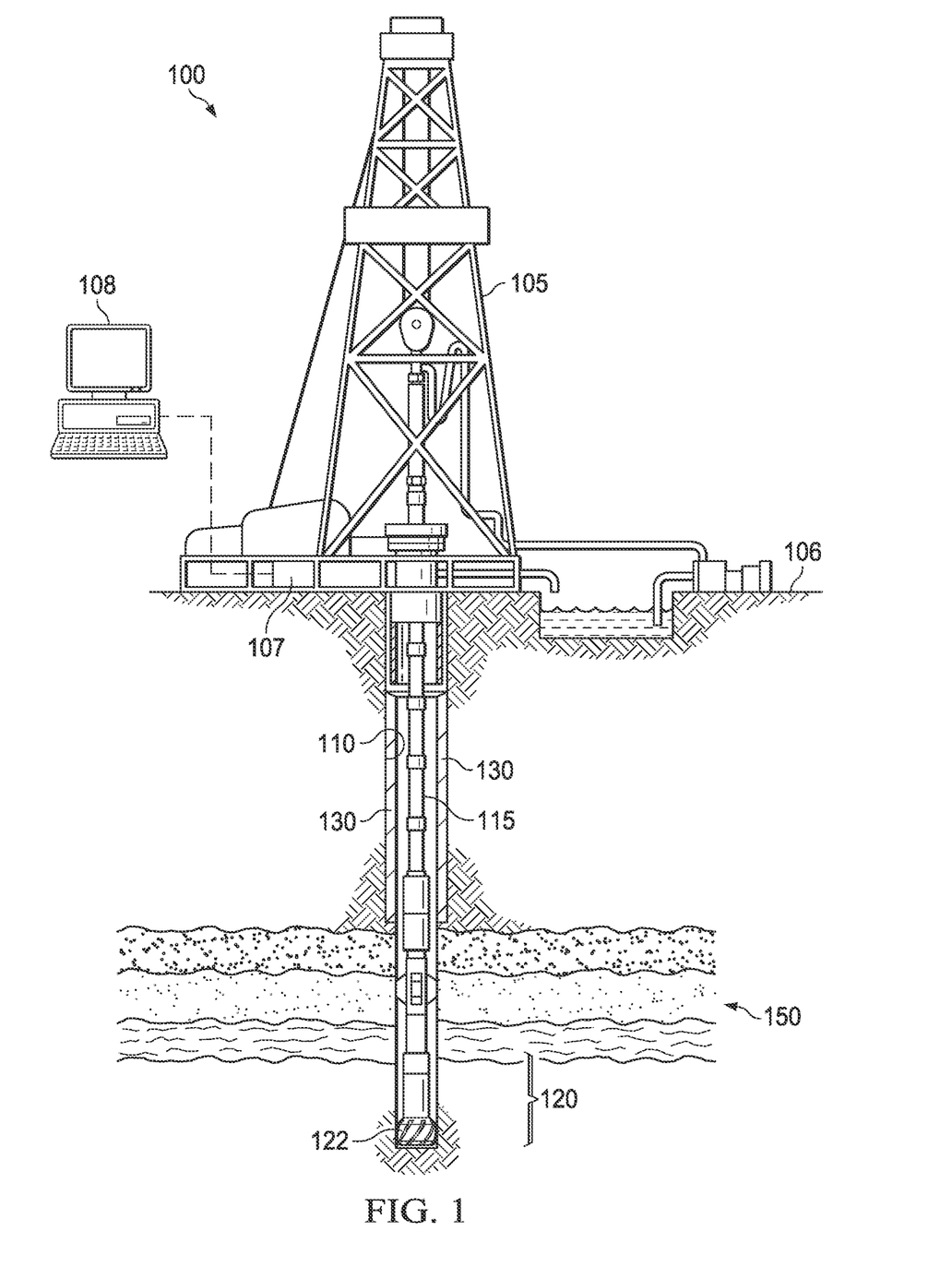
FIG. 1 is an illustration of a diagram of an example drilling system.

Turning now to the figures, FIG. 1 is an illustration of a diagram of an example drilling system 100, for example, a logging while drilling (LWD) system, a measuring while drilling (MWD) system, a seismic while drilling (SWD) system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a bottom hole assembly (BHA). At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120.

Casing 130 can act as barrier between subterranean formation 150 and the fluids and material internal to borehole 110, as well as drill string 115. In some aspects, as drill string 115 rotates within borehole 110 or during trip in or trip out operations, there can be wear of casing 130. In some aspects, as fluid passes through borehole 110, corrosion can effect casing 130, for example, when the fluid is acidic. Casing 130 should be designed to account for this wear or corrosion for an operational time interval, such as the operational lifetime of borehole 110. Replacing casing sections of casing 130 can be scheduled though it can be more cost effective to design casing 130 prior to placement to avoid replacement during the operational time interval.

Figure 2:
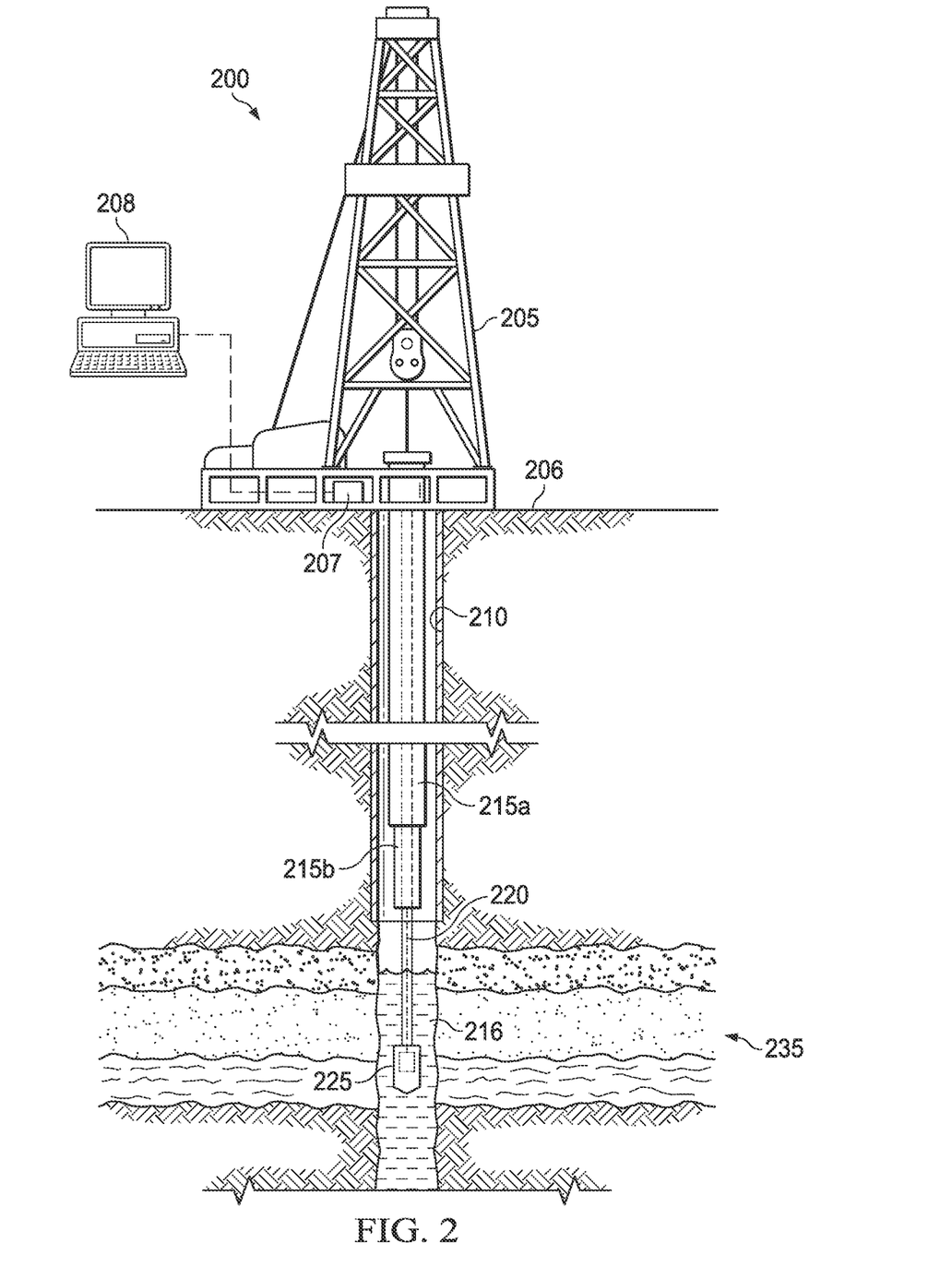
FIG. 2 is an illustration of a diagram of an example wireline system.

FIG. 2 is an illustration of a diagram of an example wireline system 200. Wireline system 200 depicts a wireline well system and includes a derrick 205, a well site controller 207, and a computing system 208. Well site controller 207 includes a processor and a memory and is operable to direct operation of wireline system 200. Derrick 205 is located at a surface 206. Computing system 208 can be proximate well site controller 207 or be a distance away, such as in a cloud environment, a data center, a lab, or a corporate office. Computing system 208 can be a laptop, smartphone, PDA, server, desktop computer, cloud computing system, and other computing systems.

Extending below derrick 205 is a borehole 210, with a cased section 215a, a cased section 215b, and one uncased section 216. Wireline 220 is inserted in borehole 210 to hold a downhole tool 225. Borehole 210 is surrounded by a subterranean formation 235 which includes a hydrocarbon reservoir. In some aspects, cased section 215a and cased section 215b can be designed to withstand subterranean formation 235. In some aspects, cased section 215a and cased section 215b can be designed to withstand the operations of downhole tool 225. In some aspects, cased section 215a and cased section 215b can be designed to withstand corrosion from fluid flowing through borehole 210. The design parameters of cased section 215a can vary from the design parameters of cased section 215b. It is beneficial for cased section 215a and cased section 215b to be designed for a desired operational time interval or an operational lifetime of borehole 210 to minimize the cost of replacing a section of casing.

Figure 3:
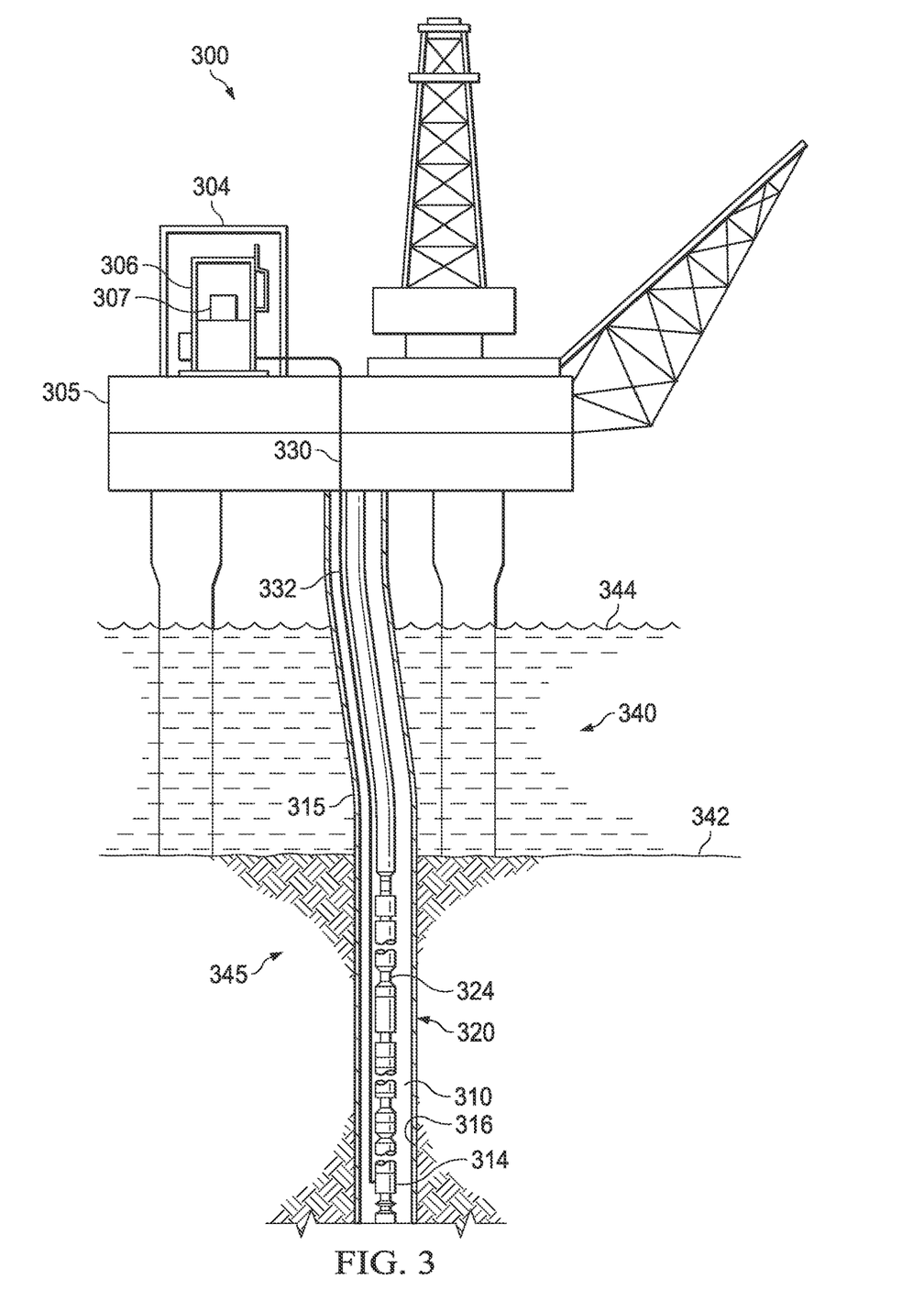
FIG. 3 is an illustration of a diagram of an example offshore system.

FIG. 3 is an illustration of a diagram of an example offshore system 300 with an electric submersible pump (ESP) assembly 320. ESP assembly 320 is placed downhole in a borehole 310 below a body of water 340, such as an ocean or sea. Borehole 310, protected by casing, screens, or other structures, is surrounded by subterranean formation 345. ESP assembly 320 can be used for onshore operations. ESP assembly 320 includes a well controller 307 (for example, to act as a speed and communications controller of ESP assembly 320), an ESP motor 314, and an ESP pump 324.

Well controller 307 is placed in a cabinet 306 inside a control room 304 on an offshore platform 305, such as an oil rig, above water surface 344. Well controller 307 is configured to adjust the operations of ESP motor 314 to improve well productivity. In the illustrated aspect, ESP motor 314 is a two-pole, three-phase squirrel cage induction motor that operates to turn ESP pump 324. ESP motor 314 is located near the bottom of ESP assembly 320, just above downhole sensors within borehole 310. A power/communication cable 330 extends from well controller 307 to ESP motor 314. A fluid pipe 332 fluidly couples equipment located on offshore platform 305 and ESP pump 324.

In some aspects, ESP pump 324 can be a horizontal surface pump, a progressive cavity pump, a subsurface compressor system, or an electric submersible progressive cavity pump. A motor seal section and intake section may extend between ESP motor 314 and ESP pump 324. A riser 315 separates ESP assembly 320 from water 340 until sub-surface 342 is encountered, and a casing 316 can separate borehole 310 from subterranean formation 345 at and below sub-surface 342. Perforations in casing 316 can allow the fluid of interest from subterranean formation 345 to enter borehole 310. In some aspects, the design of casing 316 should be sufficient to maintain integrity of borehole 310 for an operational time interval or for the lifetime of operations of borehole 310.

Figure 4:
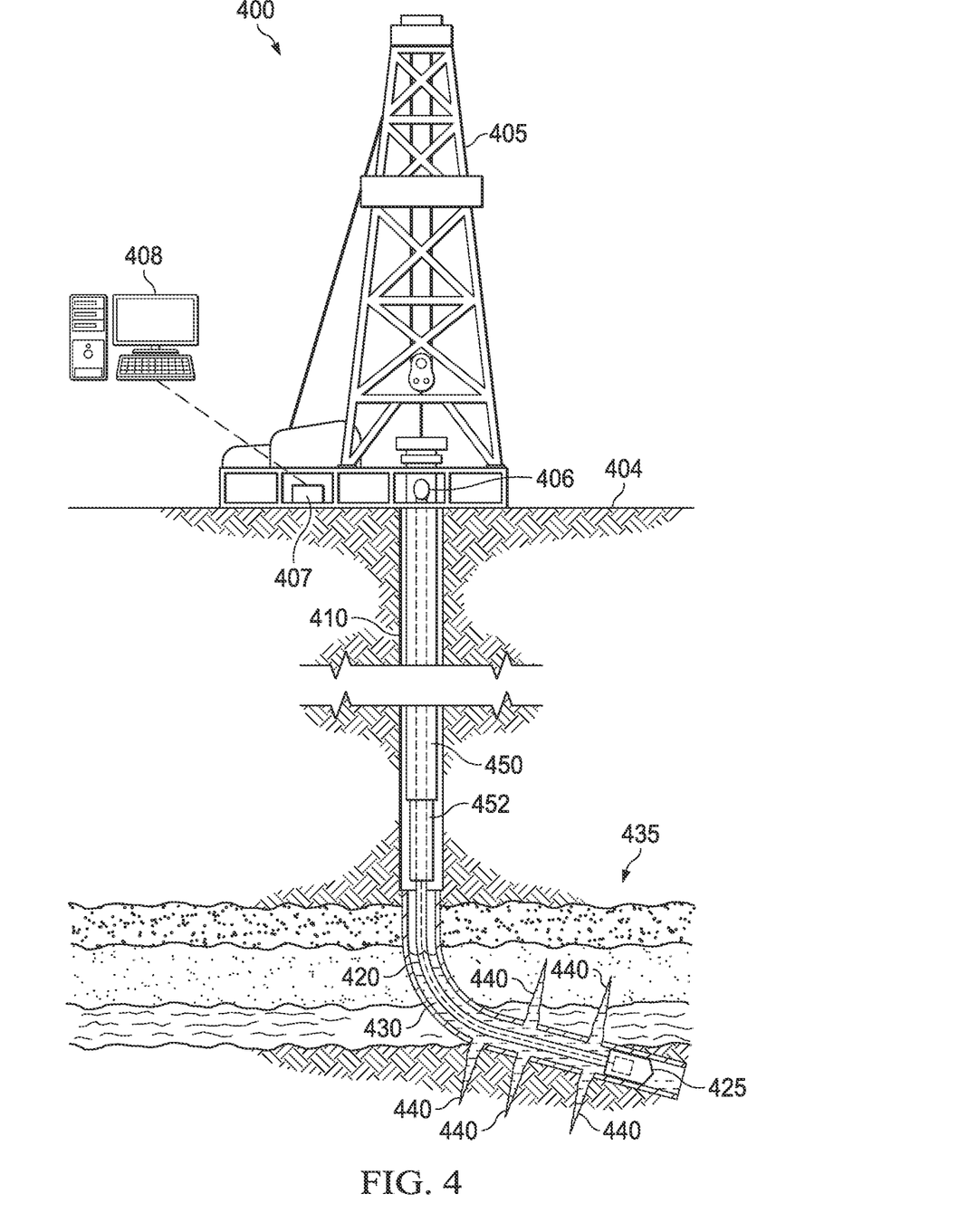
FIG. 4 is an illustration of a diagram of an example hydraulic fracturing system.

FIG. 4 is an illustration of a diagram of an example hydraulic fracturing (HF) well system 400, which can be a well site where HF operations are occurring through the implementation of a HF treatment stage plan. HF well system 400 demonstrates a nearly horizontal wellbore undergoing a fracturing operation.

HF well system 400 includes surface well equipment 405 located at a surface 404, a well site controller 407, a surface HF pump system 406, and a computing system 408. In some aspects, well site controller 407 is communicatively connected to separate computing system 408, for example, a separate server, data center, cloud service, tablet, laptop, smartphone, or other types of computing systems capable of executing the processes and methods described herein. Computing system 408 can be located proximate to well site controller 407 or located a distance from well site controller 407.

Extending below surface 404 from surface well equipment 405 is a borehole 410. Borehole 410 can have zero or more cased sections, such as a cased section 450 and cased section 452, and a bottom section that is uncased. Inserted into borehole 410 is a fluid pipe 420. The bottom portion of fluid pipe 420 has the capability of releasing downhole material 430, such as carrier fluid with diverter material, from fluid pipe 420 to subterranean formations 435 containing fractures 440. The release of downhole material 430 can be by perforations in fluid pipe 420, by valves placed along fluid pipe 420, or by other release means. At the end of fluid pipe 420 is an end of pipe assembly 425, which can be one or more downhole tools or an end cap assembly. Cased section 450 and cased section 452 can utilize differing tubular structure designs, such as a plastic material lined tubular structure.

As described in FIGS. 1-3, cased section 450 and cased section 452 can be designed to withstand subterranean formation 435, resist corrosion from downhole material 430, and operations internal of borehole 410 so as to reduce the incidence that the respective cased sections would need to be replaced during an operational time interval or the operational lifetime of borehole 410. The design of cased section 450 and cased section 452 can be optimized to minimize cost while satisfying the operational goal.

FIGS. 1, 2, and 4 depict onshore operations. Those skilled in the art will understand that the disclosure is equally well suited for use in offshore operations, such as shown in FIG. 3. FIGS. 1-4 depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 5:
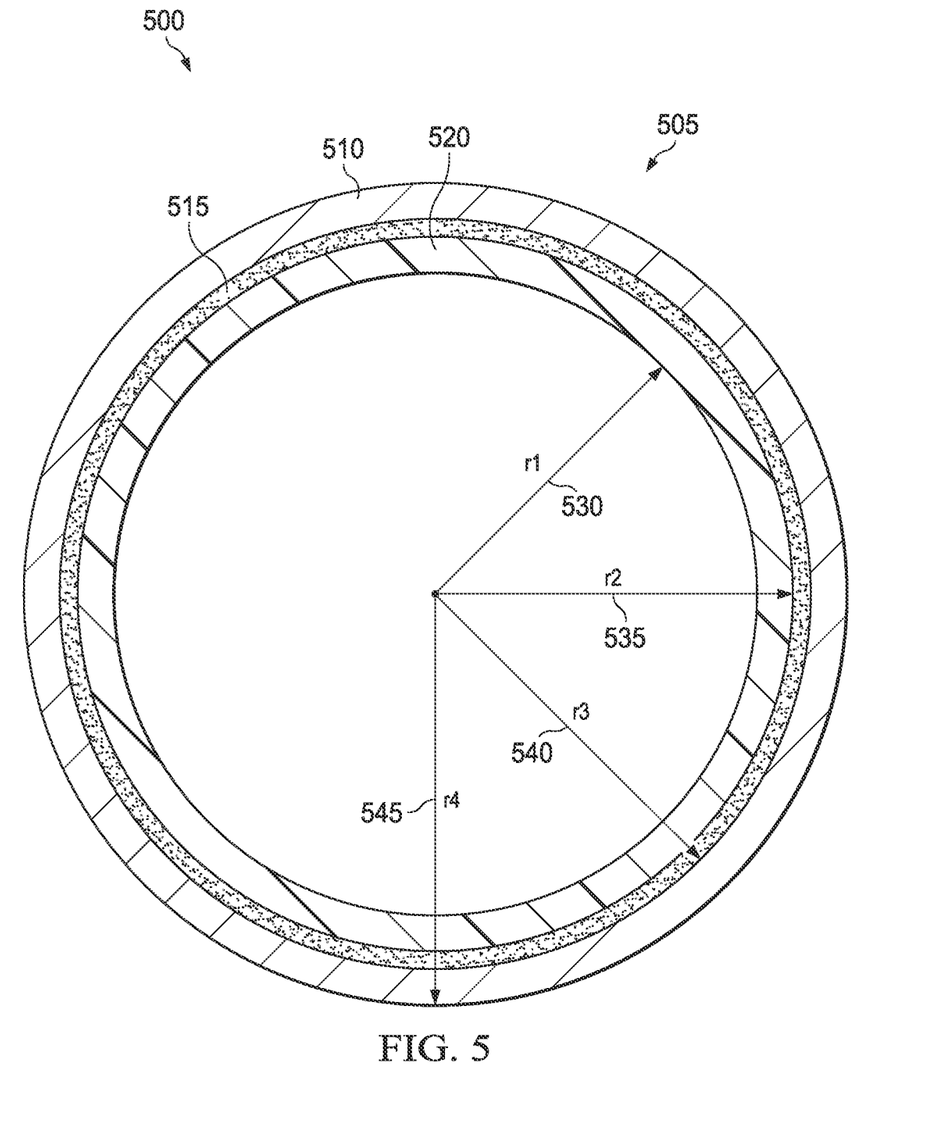
FIG. 5 is an illustration of a diagram of an example cross-sectional view of a plastic material lined tubular structure.

FIG. 5 is an illustration of a diagram of an example cross-sectional view 500 of a plastic material lined tubular structure 505. Tubular structure 505 can be of various types of tubular structures, such as casing, fluid pipes, downhole tool casings, or drill strings. Metal layer 510 forms the outer layer of tubular structure 505. Metal layer 510 can be carbon-steel, steel, metal alloys, or other combinations of materials used for conventional tubular structures. A grout layer 515 is a layer between metal layer 510 and a plastic material layer 520. Grout layer 515 can be one or more of various types of adhesives that are capable of adhering plastic material layer 520 to metal layer 510. In this example, plastic material layer 520 is the innermost layer of tubular structure 505, so as corrosive fluids flow through tubular structure 505, plastic material layer 520 can protect the other portions of tubular structure 505. The combined layers of tubular structure 505 can be more difficult to analyze for design purposes than conventional tubular structures because each respective layer can exhibit differing characteristics, for example, the thermal and mechanical properties can be different.

When performing an analysis of the tubular structure design of tubular structure 505, the wall thickness of each layer can be used. In aspects where metal layer 510 is used, the wall thickness of metal layer 510 can be used in the analysis. As corrosion occurs, the respective wall thicknesses can decrease. In some aspects, various radii of tubular structure 505 can be utilized to determine the respective wall thicknesses. A radius r1 530 is a radius from the center of tubular structure 505 to the ID of plastic material layer 520. A radius r2 535 is a radius from the center of tubular structure 505 to the outer diameter (OD) of plastic material layer 520, which is the ID of grout layer 515. A radius r3 540 is a radius from the center of tubular structure 505 to the OD of grout layer 515, which is the ID of metal layer 510. A radius r4 545 is a radius from the center of tubular structure 505 to the OD of metal layer 510.

Figure 6A:
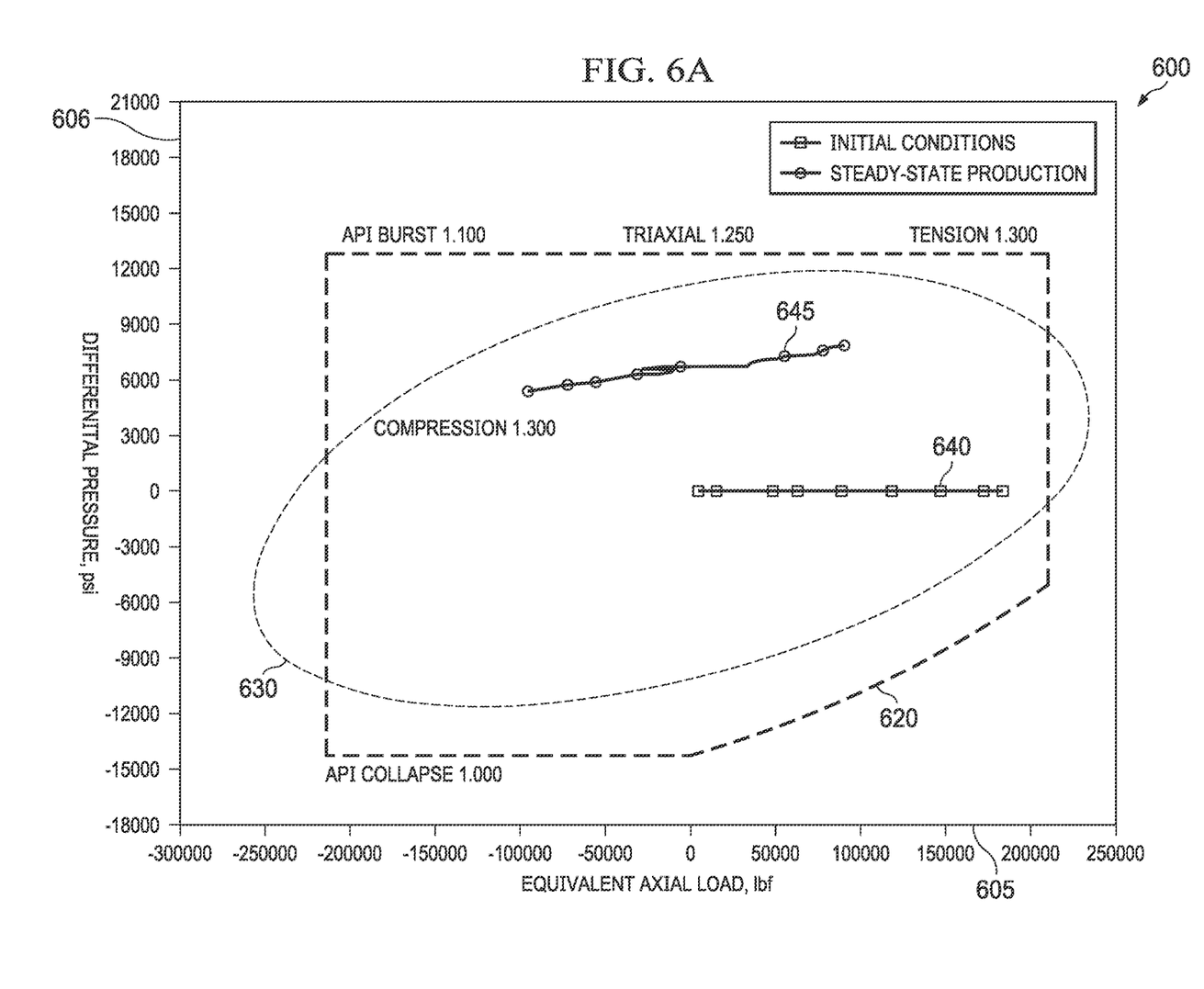
FIG. 6A is an illustration of a diagram of an example graph of a metal tubular structure.

FIG. 6A is an illustration of a diagram of an example graph 600 of a metal tubular structure. Graph 600 utilizes sample data executed through a stress analysis with the results plotted on graph 600. Graph 600 utilizes, as the demonstration sample, C-75 carbon steel as the metal tubular structure, with an OD of 3.5 inches and an ID of 2.75 inches. Graph 600 includes an x-axis 605 indicating the equivalent axial load, in pounds per foot. A y-axis 606 indicates the differential pressure in pounds per square inch.

In plot area of graph 600, a limit box 620 roughly approximates a combination of the various stress factors, such as an axial burst factor, a triaxial and torsion stress factors, a tension factor, a compression factor, and a collapse rating factor. A safety factor 630, shown as an oval, approximates the design safety of the metal tubular structure. Line 640 is the initial state of the metal tubular structure. Line 640 is within the bounds of safety factor 630 which indicates a satisfactory design at the initial stage. Line 645 is the steady state production effects on the metal tubular structure. Line 645 is within the bounds of safety factor 630 which indicates a satisfactory design during the production stages of the borehole.

Figure 6B:
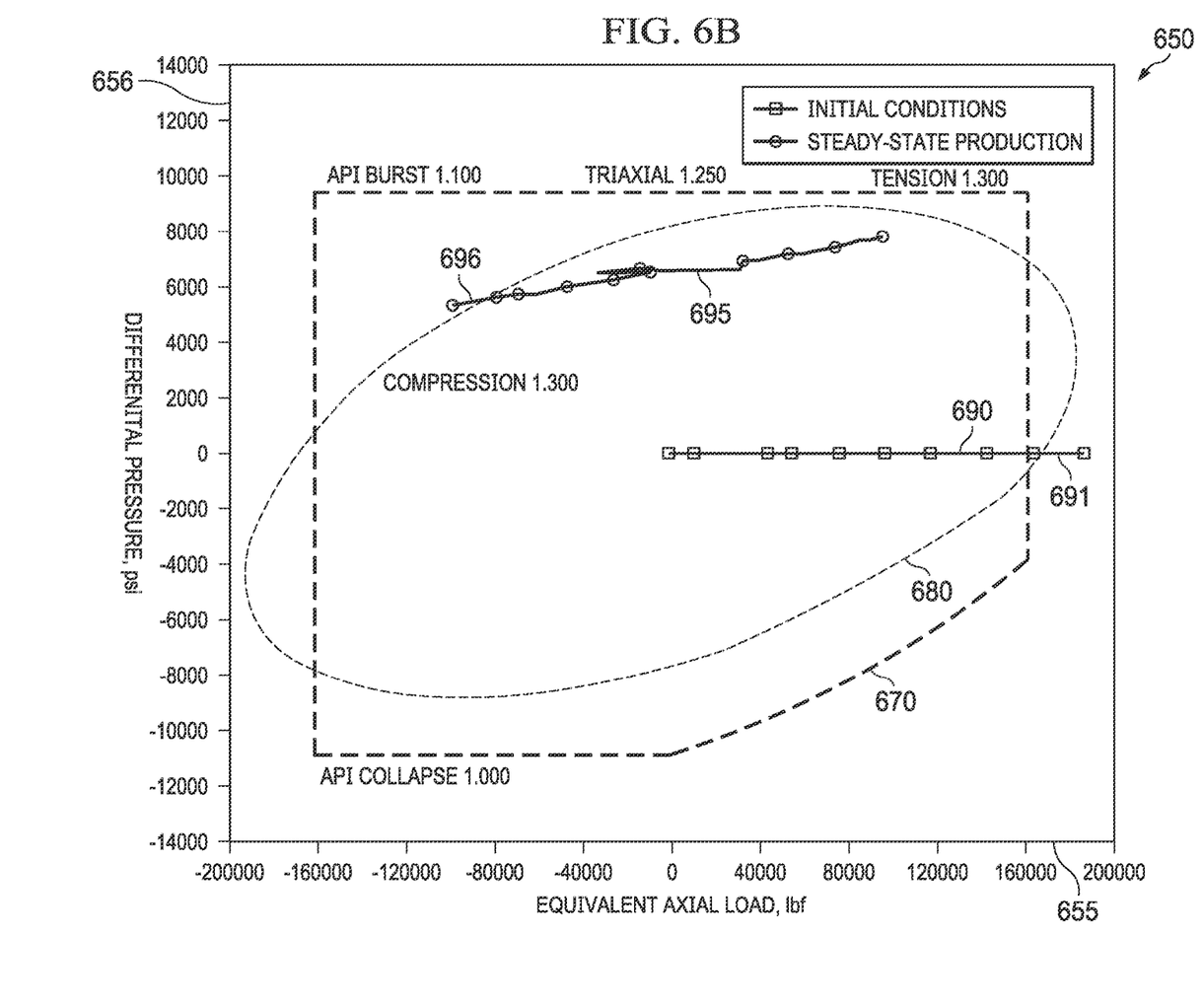
FIG. 6B is an illustration of a diagram of an example graph of a plastic material lined tubular structure.

FIG. 6B is an illustration of a diagram of an example graph 650 of a plastic material lined tubular structure. Graph 650 is similar to graph 600 though using a different tubular structure, a plastic material lined tubular structure. Graph 650 utilizes, as the demonstration sample, C-75 carbon steel with a plastic material layer attached to the ID of the C-75 carbon steel. The overall dimensions of the tubular structure is the same as used in graph 600, with some of the C-75 carbon steel replaced with a grout layer and a plastic material layer. The sample data was processed using the processes and methods as disclosed herein. Graph 650 includes an x-axis 655 indicating the equivalent axial load, in pounds per foot. A y-axis 656 indicates the differential pressure in pounds per square inch.

In plot area of graph 650, a limit box 670 roughly approximates a combination of the various stress factors, such as an axial burst factor, a triaxial and torsion stress factors, a tension factor, a compression factor, and a collapse rating factor. A safety factor 680, shown as an oval, approximates the design safety of the plastic material lined tubular structure. Line 690 is the initial state of the plastic material lined tubular structure. Line 690 is partially outside of the bounds of safety factor 680, as shown by line portion 691, which indicates an unsatisfactory design at the initial stage. Line 695 is the steady state production effects on the plastic material lined tubular structure. Line 695 is partially outside of the bounds of safety factor 680, as shown by line portion 696, which indicates an unsatisfactory design during the production stages of the borehole. This indicates that the wall thickness of the metal portion of plastic material lined tubular structure should be increased to improve the various stress analysis factors, thereby increasing the size of safety factor 680.

Figure 7:
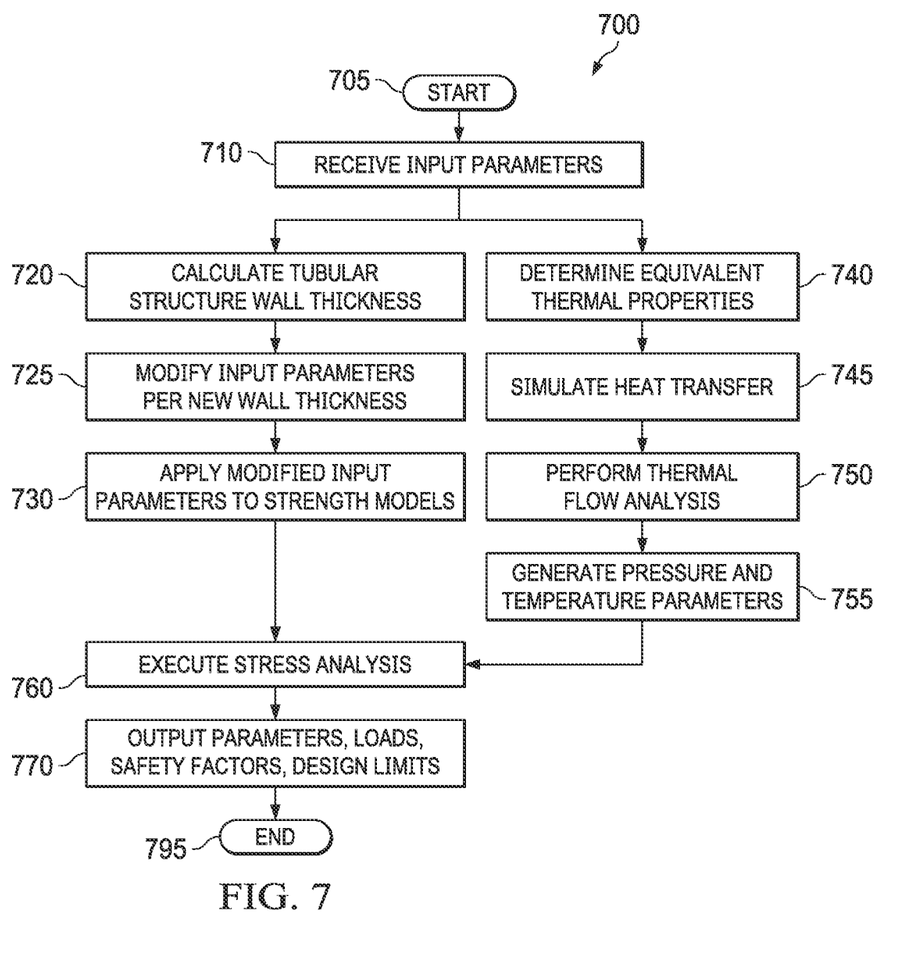
FIG. 7 is an illustration of a flow diagram of an example method of a stress analysis of a tubular structure.

FIG. 7 is an illustration of a flow diagram of example method 700 of a stress analysis of a plastic material lined tubular structure. Method 700 can be performed on a computing system, such as a well site controller, a server, a laptop, a mobile device, a cloud computing system, or other computing system capable of receiving the input parameters and outputting results. Other computing systems can be a smartphone, a mobile phone, a PDA, a laptop computer, a desktop computer, a server, a data center, a cloud environment, or other computing system. The computing system can be located proximate a borehole or can be located in a data center, a cloud environment, a lab, a corporate office, or other distance locations. Method 700 can be encapsulated in software code or in hardware, for example, an application, a code library, a dynamic link library, a module, a function, a RAM, a ROM, and other software and hardware implementations. The software can be stored in a file, database, or other computing system storage mechanism. Method 700 can be partially implemented in software and partially in hardware.

Method 700 starts at a step 705 and proceeds to a step 710 where input parameters are received. In some aspects the input parameters include the wall thickness or radius parameters of the plastic material lined tubular structure, which can include parameters for each layer of the tubular structure, such as the wall thickness or radius parameters of the metal layer, of the grout layer, and of the plastic material layer. In some aspects the input parameters can include the anticipated downhole conditions, for example, mineralogy factors, temperature factors, pressure factors, measured depth, true vertical depth, fluid exposure factors, electromagnetic exposure factors, and other downhole conditions. In some aspects the input parameters can include a tolerance factors or tolerance thresholds and a selected strength model to be used for each stress analysis factor, for example, an axial strength model, a triaxial strength model, a tension strength model, a torsion strength model, a compression strength model, and a collapse strength model.

In some aspects, default parameters can be utilized in place of receiving one or more of the input parameters. In some aspects, a machine learning algorithm can be used in place of some of the input parameters, for example, the downhole condition factors can be determined using an output from the machine learning algorithm to improve the efficiency of the method results.

Proceeding from step 710, method 700 can proceed to a step 720 or a step 740. Step 720 and its subsequent steps through a step 730, and step 740 its subsequent steps through step 755 can be performed serially, in parallel, partially overlapping, or various combinations thereof. In step 720 the tubular wall thickness can be calculated using the input parameters. For example, if the input parameters include an ID or OD radius for each layer of the tubular structure, the step can convert the input parameters to a wall thickness parameter.

Proceeding to a step 725, the critical dimensions, including the wall thickness can be modified using the output of step 720 and the input parameters to generate an adjusted wall thickness. This modification can take into account the wall thickness of the grout layer and the plastic material layer. In aspects where the grout layer and the plastic material layer are not incorporated into the stress analysis, these portions of the wall thickness can be removed from the critical dimensions and other input parameters, such as reducing the wall thickness by a percentage or a measured value to represent the metal layer.

In step 730, the modified input parameters, such as the critical dimensions and wall thickness parameters, can be applied to one or more strength models, such as a standard strength model, a hybrid strength model, or other models to generate a respective strength rating for the utilized strength models.

Proceeding from step 710, in step 740, the equivalent thermal properties can be determined of the plastic material lined tubular structure. The thermal properties can be the density, the thermal conductivity, and the thermal capacity. The equivalent density can be determined, for example, using Equation 1.

Equation 1: Example Equivalent Density Calculation $$\text{Equivalent density} = \frac{\begin{pmatrix}\text{metal weight per foot} + \\ \text{plastic material weight per foot}\end{pmatrix}}{\text{volume per foot}}$$

The equivalent conductivity can be determined, for example, by using Equations 2-4.

Equation 2: Example Heat Transfer Using Heat Loss Principles $$\frac{1}{Q_{total}} = \frac{1}{Q_{metal}} + \frac{1}{Q_{grout}} + \frac{1}{Q_{plastic\ material}}$$

where $Q_{total}$ is the total heat loss in watts, $Q_{metal}$ is the heat loss of the metal in watts, $Q_{grout}$ is the heat loss of the grout in watts, and $Q_{plastic\ material}$ is the heat loss of the plastic material in watts.

Equation 3: Example Conductivity Transfer Using Thermal Conductivity Principles $$\frac{1}{Q_{total}} = \frac{1}{2\pi}\left[\left(\frac{\ln\left(\frac{r4}{r3}\right)}{K_{metal}}\right) + \left(\frac{\ln\left(\frac{r3}{r2}\right)}{K_{grout}}\right) + \left(\frac{\ln\left(\frac{r2}{r1}\right)}{K_{plastic\ material}}\right)\right]$$

where $K_{metal}$ is the thermal conductivity of the metal in watts per meter-Celsius, $K_{grout}$ is the thermal conductivity of the grout watts per meter-Celsius, $K_{plastic\ material}$ is the thermal conductivity of the plastic material watts per meter-Celsius, r1 is the radius from the center of the tubular structure to the ID of the plastic material layer, r2 is the radius from the center of the tubular structure to the ID of the grout layer, r3 is the radius from the center of the tubular structure to the ID of the metal layer, and r4 is the radius from the center of the tubular structure to the OD of the metal layer.

Equation 4: Example Equivalent Thermal Conductivity Calculation $$K_{total} = \left(Q_{total} * \frac{\ln\left(\frac{r4}{r1}\right)}{2\pi}\right)$$

where $K_{total}$ is the equivalent thermal conductivity in watts per meter-Celsius.

The equivalent heat capacity can be determined, for example, by using Equation 5.

Equation 5: Example Equivalent Heat Capacity Calculation $$Cp_{total} = \left(\left(\frac{M1}{MT}Cp_{metal}\right) + \left(\frac{M2}{MT}Cp_{grout}\right) + \left(\frac{M3}{MT}Cp_{plastic\ material}\right)\right)$$

where $Cp_{total}$ is the equivalent heat capacity, $Cp_{metal}$ is the heat capacity of the metal layer, $Cp_{grout}$ is the heat capacity of the grout layer, $Cp_{plastic\ material}$ is the heat capacity of the plastic material layer, M1 is the mass of the metal layer is grams per foot, M2 is the mass of the grout layer in grams per foot, M3 is the mass of the plastic material layer in grams per foot, and MT is the total mass of the tubular structure in grams per foot.

Proceeding from step 740 to a step 745, the equivalent thermal properties determined in step 740 can be used as input to simulate heat transfer of the plastic material lined tubular structure. In a step 750, a thermal flow analysis can be performed using the output of step 745 and the input parameters. In a step 755, a pressure parameter and a temperature parameter can be generated using the output of step 750 and the input parameters.

Proceeding from step 730 and step 755, is step 760. In step 760, a stress analysis is executed using the outputs of step 730 and step 755 as well as the input parameters. The stress analysis can generate updated loads, updated safety factors, and updated design limit parameters, such as an axial rating, a burst rating, a collapse strength rating, a tension rating, a torsion rating, a compression rating, and a triaxial rating. In a step 770, one or more of the input parameters, the modified input parameters, the updated loads, the updated safety factors, the updated design limit parameters, and other result parameters can be output, e.g., communicated, to another system for further analysis or processing, for example, a user, a borehole planning system, or another computing system. Method 700 ends at a step 795.

Figure 8:
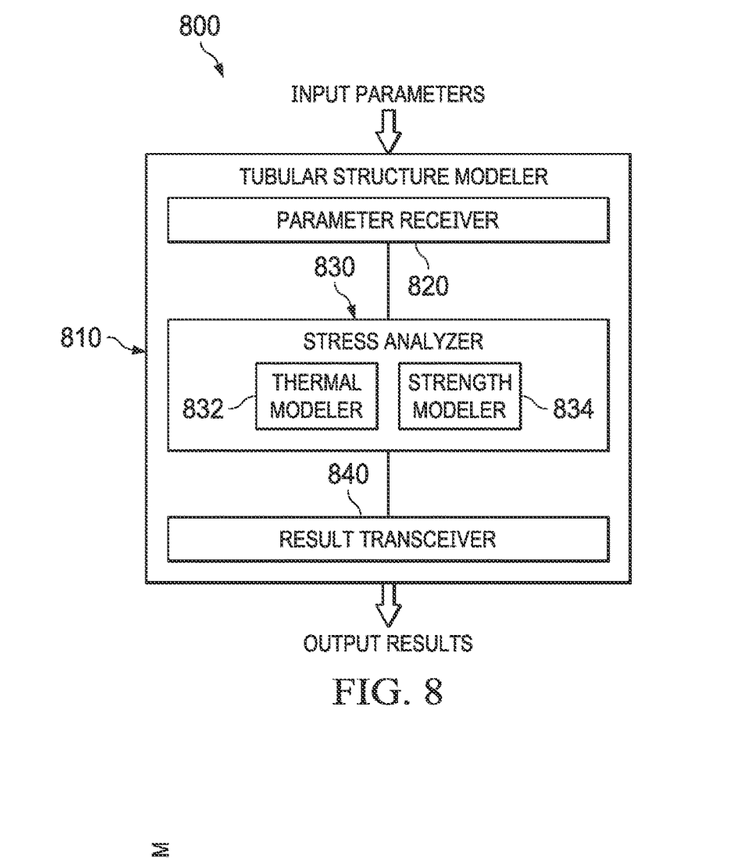
FIG. 8 is an illustration of a block diagram of an example tubular structure design system.

FIG. 8 is an illustration of a block diagram of an example tubular structure design system 800, which can be implemented using one or more computing systems, for example, a well site controller, a reservoir controller, a data center, a cloud environment, a server, a laptop, a smartphone, a mobile phone, a tablet, and other computing systems. The computing system can be located proximate the well site, or a distance from the well site, such as in a data center, cloud environment, corporate location, a lab environment, or another location. The computing system can be a distributed system having a portion located proximate the borehole and a portion located remotely from the well site.

Tubular structure design system 800, or a portion thereof, can be implemented as an application, a code library, a dynamic link library, a function, a module, other software implementation, or combinations thereof. In some aspects, tubular structure design system 800 can be implemented in hardware, such as a ROM, a graphics processing unit, or other hardware implementation. In some aspects, tubular structure design system 800 can be implemented partially as a software application and partially as a hardware implementation. In some aspects, tubular structure design system 800 can be implemented using a tubular structure design controller 900 of FIG. 9.

Tubular structure design system 800 has a tubular structure modeler 810 that includes a parameter receiver 820, a stress analyzer 830, a thermal modeler 832, a strength modeler 834, and a result transceiver 840. The results and outputs from tubular structure modeler 810 can be communicated to another system, such as one or more of a well site controller, a computing system, or a user. In some aspects, the communicated results can be used as inputs to a design operation for the borehole to identify appropriate casing to be utilized. In some aspects, the communicated results can be used as inputs into a borehole well planning system. A memory or data storage of tubular structure modeler 810 can be configured to store the processes and algorithms for directing the operations thereof.

Parameter receiver 820 can receive input parameters to direct further operations. The input parameters can be parameters, instructions, directions, data, and other information to enable or direct the remaining processing of tubular structure design system 800. In some aspects, the input parameters include the wall thickness or radius parameters of the selected tubular structure, which can include parameters for each layer of the tubular structure, such as the wall thickness or radius parameters of the metal layer, of the grout layer, and of the plastic material layer. In some aspects, the input parameters can include the anticipated downhole conditions, for example, mineralogy factors, temperature factors, pressure factors, measured depth, true vertical depth, fluid exposure factors, electromagnetic exposure factors, and other downhole conditions. In some aspects, the input parameters can include a tolerance factors or tolerance thresholds, and a selected strength model to be used for each stress analysis factor, for example, an axial strength model for axial factors, a triaxial strength model for triaxial factors, a tension strength model for tension factors, a torsion strength model for torsion stress factors, a compression strength model for compression factors, and a collapse strength model for collapse factors.

In some aspects, default parameters can be specified by tubular structure modeler 810, where those parameters can be utilized in place of receiving one or more of the input parameters. In some aspects, tubular structure modeler 810 can utilize a machine learning algorithm to generate one or more of the input parameters, for example, the downhole condition factors can be determined using an output from the machine learning algorithm to improve the efficiency of the method results.

Stress analyzer 830 can implement the processes and methods as described herein utilizing the input parameters. Stress analyzer 830 can use one or more algorithms to determine the result parameters, such as the load parameters, the safety factor parameters, and the design limit parameters. Stress analyzer 830 can direct operation of the thermal modeler 832 and the strength modeler 834. Thermal modeler 832 can perform operations to determine equivalent thermal properties, simulate heat transfer, perform thermal flow analysis, and to generate pressure parameters and temperature parameters. Strength modeler 834 can perform operations to calculate tubular structure wall thicknesses, and modify the input parameters per the calculated wall thicknesses, and to apply the modified input parameters to one or more strength models. Stress analyzer 830 can perform operations to execute one or more stress analysis processes combining the outputs of the strength models and the thermal models.

Tubular structure design system 800 demonstrates a functional view of the disclosure, and the described functions can be implemented in one or more functional units, for example, parameter receiver 820 or result transceiver 840 can be incorporated into stress analyzer 830. In some aspects, the thermal modeler 832 and the strength modeler 834 can be implemented in the same modeler. In some aspects, thermal modeler 832 or strength modeler 834 can be incorporated into stress analyzer 830.

Result transceiver 840 can communicate one or more generated outputs and results, such as one or more load parameters, one or more a safety factors, or one or more design limit parameters, to one or more other systems, such as a well site controller, a computing system, a user, or other borehole related systems. Parameter receiver 820 and result transceiver 840 can be, or can include, conventional interfaces configured for transmitting and receiving data.

Figure 9:
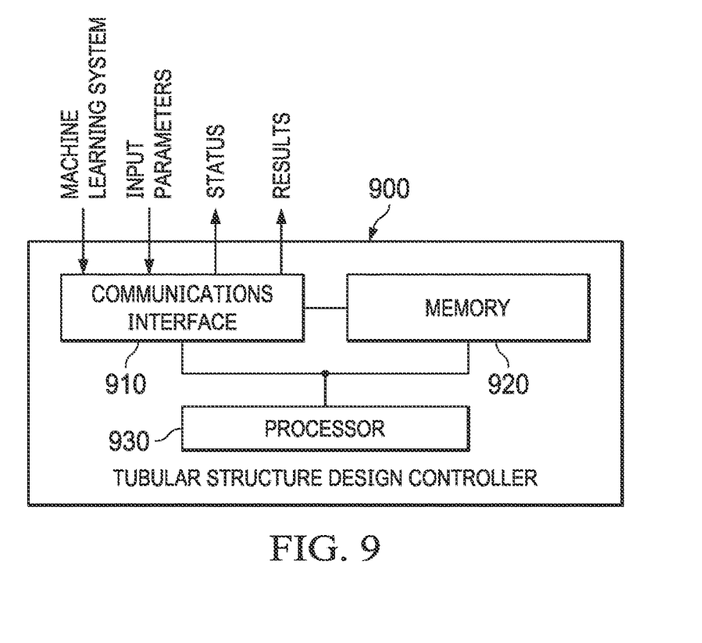
FIG. 9 is an illustration of a block diagram of an example of a tubular structure design controller according to the principles of the disclosure.

FIG. 9 is an illustration of a block diagram of an example of tubular structure design controller 900 according to the principles of the disclosure. Tubular structure design controller 900 can be stored on a single computer or on multiple computers. The various components of tubular structure design controller 900 can communicate via wireless or wired conventional connections. A portion of tubular structure design controller 900 can be located downhole at one or more locations and other portions of tubular structure design controller 900 can be located on a computing device or devices located at the surface or a distant location. In some aspects, tubular structure design controller 900 can be wholly located at a surface or distant location. In some aspects, tubular structure design controller 900 is part of a borehole planner system or a wellsite job planner system, and can be integrated in a single device.

Tubular structure design controller 900 can be configured to perform the various functions disclosed herein including receiving input parameters and generating results from an execution of a stress analysis using a hybrid modeler, such as a thermal modeler and a strength modeler. Tubular structure design controller 900 includes a communications interface 910, a memory 920, and a processor 930.

Communications interface 910 is configured to transmit and receive data. For example, communications interface 910 can receive input parameters regarding the tubular structure and the anticipated conditions that will be experienced downhole a borehole. Communications interface 910 can transmit the results and other generated parameters, such as the calculated safety factors over time at various borehole depths. In some aspects, communications interface 910 can transmit a status, such as a success or failure indicator of tubular structure design controller 900 regarding receiving the input parameters, transmitting the results, or generating the results. In some aspects, communications interface 910 can receive input parameters from a machine learning system, such as borehole conditions that could be experienced downhole during the time interval of the analysis. Communications interface 910 can communicate via communication systems used in the industry. For example, wireless or wired protocols can be used. Communication interface 910 is capable of performing the operations as described for parameter receiver 820 and result transceiver 840.

Memory 920 can be configured to store a series of operating instructions that direct the operation of processor 930 when initiated, including the code representing the algorithms for determining the safety factors for a plastic material lined tubular structure. Memory 920 is a non-transitory computer readable medium. Multiple types of memory can be used for data storage and memory 920 can be distributed.

Processor 930 can be configured to determine results and statuses utilizing the received input parameters, and, if provided, the machine learning system inputs. For example, processor 930 can perform a stress analysis on the plastic material lined tubular structure by applying the anticipated downhole conditions. Processor 930 can be configured to direct the operation of the tubular structure design controller 900. Processor 930 includes the logic to communicate with communications interface 910 and memory 920, and perform the functions described herein to determine the results and statuses. Processor 930 is capable of performing or directing the operations as described by stress analyzer 830, thermal modeler 832, and strength modeler 834.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, because the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method, comprising:
receiving input parameters for a tubular structure design of a plastic material lined tubular structure of a borehole, wherein the tubular structure design utilizes a thermal model and one or more strength models;
modifying one or more input parameters to generate modified input parameters, wherein an initial wall thickness of the tubular structure is modified to an adjusted wall thickness for each layer of the tubular structure using the input parameters;
applying the modified input parameters to the one or more strength models to generate a respective strength rating;
generating a pressure parameter and a temperature parameter using the input parameters and the thermal model; and
executing a stress analysis utilizing the modified input parameters, the respective strength rating, the pressure parameter, and the temperature parameter.

2. The method as recited in claim 1, further comprising:
communicating results, where the results are output from the stress analysis; and
adjusting the tubular structure design utilizing the results.

3. The method as recited in claim 2, wherein the results comprise one or more of one or more load factors, one or more safety factors, or one or more design limit parameters.

4. The method as recited in claim 3, wherein the one or more design limit parameters is one or more of an axial factor, a triaxial factor, a torsion stress factor, a compression factor, a collapse factor, or a tension factor.

5. The method as recited in claim 1, wherein the generating further comprises:
determining one or more equivalent thermal properties utilizing the input parameters;
simulating a heat transfer utilizing the equivalent thermal properties; and
performing a thermal flow analysis utilizing the input parameters, the equivalent thermal properties, and an output of the simulating, wherein the pressure parameter and the temperature parameter are generated utilizing an output of the thermal flow analysis.

6. The method as recited in claim 5, wherein the one or more equivalent thermal properties includes one or more of an equivalent density, an equivalent conductivity, or an equivalent heat capacity.

7. The method as recited in claim 1, wherein the applying utilizes one or more critical dimensions, where the one or more critical dimensions apply to a metal layer of the plastic material lined tubular structure.

8. The method as recited in claim 1, wherein the input parameters include one or more of a wall thickness of each layer of the plastic material lined tubular structure, a radius of an internal diameter (ID) and an outer diameter (OD) of each layer of the plastic material lined tubular structure, one or more downhole conditions, one or more tolerance factors, one or more tolerance thresholds, or the one or more strength models.

9. The method as recited in claim 1, wherein the plastic material lined tubular structure includes a metal layer, a grout layer, and a plastic material layer, wherein the plastic material layer is a polymer, a glass fiber reinforced epoxy (GRE), or a carbon fiber plastic composite.

10. A tubular structure design system, comprising:
a parameter receiver, capable to receive input parameters of a plastic material lined tubular structure; and
a stress analyzer, capable of modifying the input parameters, generating a strength rating by applying the modified input parameters to one or more strength models, and determining, using the strength rating and the modified input parameters, one or more load factors, one or more safety factors, or one or more design limit parameters to apply to the plastic material lined tubular structure for a tubular structure design for a borehole.

11. The tubular structure design system as recited in claim 10, wherein the stress analyzer further comprises:
a thermal modeler, capable of applying a thermal model to the input parameters; and
a strength modeler, capable of applying the one or more strength models to the input parameters.

12. The tubular structure design system as recited in claim 11, wherein the thermal modeler is capable of determining one or more equivalent thermal properties, simulating a heat transfer, performing a thermal flow analysis, and generating a pressure parameter and a temperature parameter, where the stress analyzer utilizes the pressure parameter and the temperature parameter.

13. The tubular structure design system as recited in claim 11, wherein the strength modeler is capable of calculating a tubular structure wall thickness, modifying the input parameters using the tubular structure wall thickness, and applying the input parameters to the one or more strength models, where the stress analyzer utilizes one or more outputs of the one or more strength models.

14. The tubular structure design system as recited in claim 10, wherein the one or more strength models are one or more of an axial strength model, a triaxial strength model, a torsion strength model, a tension strength model, a compression strength model, or a collapse strength model.

15. The tubular structure design system as recited in claim 10, wherein the input parameters comprise one or more of a wall thickness of each layer of the plastic material lined tubular structure, a radius of an internal diameter (ID) and an outer diameter (OD) of each layer of the plastic material lined tubular structure, one or more downhole conditions, one or more tolerance factors, one or more tolerance thresholds, or the one or more strength models.

16. A computer program product having a series of operating instructions stored on a non-transitory computer-readable medium that directs a data processing apparatus when executed thereby to perform operations, the operations comprising:
receiving input parameters for a tubular structure design of a plastic material lined tubular structure of a borehole, wherein the tubular structure design utilizes a thermal model and one or more strength models;
modifying one or more input parameters to generate modified input parameters, wherein an initial wall thickness of the tubular structure is modified to an adjusted wall thickness for each layer of the tubular structure using the input parameters;
applying the modified input parameters to the one or more strength models to generate a respective strength rating;
generating a pressure parameter and a temperature parameter using the input parameters and the thermal model; and
executing a stress analysis utilizing the modified input parameters, the respective strength rating, the pressure parameter, and the temperature parameter.

17. The computer program product as recited in claim 16, further comprising:
communicating results, where the results are output from the stress analysis; and
adjusting the tubular structure design utilizing the results.

18. The computer program product as recited in claim 17, wherein the results comprise one or more of one or more load factors, one or more safety factors, or one or more design limit parameters.

19. The computer program product as recited in claim 18, wherein the one or more design limit parameters is one or more of an axial factor, a triaxial factor, a torsion stress factor, a compression factor, a collapse factor, or a tension factor.

20. The computer program product as recited in claim 16, wherein the generating further comprises:
determining one or more equivalent thermal properties utilizing the input parameters;
simulating a heat transfer utilizing the equivalent thermal properties; and
performing a thermal flow analysis utilizing the input parameters, the equivalent thermal properties, and an output of the simulating, wherein the pressure parameter and the temperature parameter are generated utilizing an output of the thermal flow analysis.

21. The computer program product as recited in claim 16, wherein the input parameters include one or more of a wall thickness of each layer of the plastic material lined tubular structure, a radius of an internal diameter (ID) and an outer diameter (OD) of each layer of the plastic material lined tubular structure, one or more downhole conditions, one or more tolerance factors, one or more tolerance thresholds, or the one or more strength models.

* * * * *